United States Patent [19]

Mack

[11] Patent Number: 5,988,958
[45] Date of Patent: Nov. 23, 1999

[54] DRILL CHUCK WITH THREADED SPINDLE HOLE

[75] Inventor: Hans-Dieter Mack, Sontheim, Germany

[73] Assignee: Rohm GmbH, Sontheim, Germany

[21] Appl. No.: 09/233,523

[22] Filed: Jan. 20, 1999

[30] Foreign Application Priority Data

Jan. 21, 1998 [DE] Germany ............... 198 02 080

[51] Int. Cl.$^6$ .................................................. B23B 31/02
[52] U.S. Cl. .................................................. 408/240; 279/62
[58] Field of Search ................................ 279/60, 61, 62; 408/124, 239 R, 240

[56] References Cited

U.S. PATENT DOCUMENTS

| | | | |
|---|---|---|---|
| 2,684,856 | 7/1954 | Stoner | 279/61 |
| 3,938,817 | 2/1976 | Rohm | 279/61 |
| 4,536,113 | 8/1985 | Hatfield | 408/240 |
| 4,645,387 | 2/1987 | Rohm | 279/62 |
| 5,009,439 | 4/1991 | Sakamaki | 279/62 |
| 5,072,954 | 12/1991 | Mack | 279/61 |
| 5,452,906 | 9/1995 | Huff et al. | 279/62 |
| 5,540,453 | 7/1996 | Sakamaki | 279/60 |
| 5,882,153 | 3/1999 | Mack et al. | 279/62 |

*Primary Examiner*—Daniel W. Howell
*Attorney, Agent, or Firm*—Herbert Dubno; Andrew Wilford

[57] ABSTRACT

A drill has a drill spindle centered on and rotatable about an axis and having a front externally threaded end and immediately thereadjacent a shank. A chuck element centered on the axis is formed with a forwardly open tool hole, axially therebehind with a threaded bore complimentarily engaging the spindle end, and immediately therebehind with a coaxial unthreaded bore surrounding the shank. An adjustment element is rotatable about the axis on the chuck element. One of the elements is formed with a plurality of angled guide passages and the other element is formed with a screwthread centered on the axis. Respective jaws in the passages and exposed in the tool hole each have a toothed edge meshing with the other-element screwthread so that relative rotation of the elements displaces the jaws along the respective passages.

7 Claims, 4 Drawing Sheets

DRILL CHUCK WITH THREADED SPINDLE HOLE

FIELD OF THE INVENTION

The present invention relates to a drill assembly. More particularly this invention concerns a drill chuck adapted to be mounted on a threaded drive spindle.

BACKGROUND OF THE INVENTION

A standard hand drill has a housing from which extends a drill spindle centered on and rotatable about an axis and having a front externally threaded end. A chuck for such a drill has a chuck element centered on the axis and formed with a forwardly open tool hole and with a threaded bore complimentarily engaging the spindle end. An adjustment element is rotatable about the axis on the chuck element and one of the elements is formed with a plurality of angled guide passages and the other element is formed with a screwthread centered on the axis. Respective jaws in the passages exposed in the tool hole each have a toothed edge meshing with the other-element screwthread so that relative rotation of the elements displaces the jaws along the respective passages. In a self-tightening chuck the screw-thread is typically formed on the chuck element or body and the passages in the rotatable adjustment element, but in a standard chuck not set up for self tightening the screwthread is on a ring forming the adjustment element and the guide passages are formed right in the chuck body.

Normally the chuck and the body of the drill are made by different manufacturers. Thus the spindle is of standardized construction, that is of a predetermined diameter and thread size, so that it can be fitted to a chuck that is similarly of standardized construction, at least with regard to the formations coupling it to the drill spindle. As a result the finished drill often has the look of something assembled out of different components in that the chuck is clearly just fitted on the end of the drill body.

OBJECTS OF THE INVENTION

It is therefore an object of the present invention to provide an improved drill.

Another object is the provision of such an improved drill which overcomes the above-given disadvantages, that is which allows a chuck and drill body to be combined to form a compact and integral-looking unit with a solid connection between the drill spindle and the chuck body.

SUMMARY OF THE INVENTION

A drill has according to the invention a drill spindle centered on and rotatable about an axis and having a front externally threaded end and immediately thereadjacent a shank. A chuck element centered on the axis is formed with a forwardly open tool hole, axially there behind with a threaded bore complimentarily engaging the spindle end, and immediately therebehind with a coaxial unthreaded bore surrounding the shank. An adjustment element is rotatable about the axis on the chuck element. One of the elements is formed with a plurality of angled guide passages and the other element is formed with a screwthread centered on the axis. Respective jaws in the passages and exposed in the tool hole each have a toothed edge meshing with the other-element screwthread so that relative rotation of the elements displaces the jaws along the respective passages.

With this system, therefore, the chuck is not merely mounted at the outer end of the drill spindle. Instead it fits complimentarily over the shank of the drill spindle and therefore is more integrally united with the drill housing. The standard such housing is generally L-shaped, with the short L-leg forming a handle and the long L-leg containing the drive motor and carrying on its outer end the chuck. This long leg therefore forms a lever arm that allows quite some lateral forces to be applied to the chuck and spindle so that it is imperative that the spindle be solidly joined to the chuck and vice versa. The system of this invention allows the chuck to be mounted more closely on the drill housing, protecting it from lever action and making the drill much easier to use.

According to the invention the unthreaded bore is of larger diameter than the threaded bore. In addition the shank and the unthreaded bore can be complementary so the shank is a snug fit in the unthreaded bore. This makes a very solid connection between the spindle and the chuck body, allowing the threaded end to be fairly short since it is mainly responsible for axial coupling.

The chuck element in accordance with the invention is formed between the threaded and unthreaded bores with a substantially planar and backwardly directed shoulder. The spindle is formed between the threaded end and shank with a forwardly directed substantially annular shoulder confronting the chuck-element shoulder. The shoulders can axially engage each other directly or a toothed washer can be axially compressed between the shoulders.

In another arrangement in accordance with the invention a set screw is threaded in the chuck element and radially inwardly bears on the shank. In addition the threaded bore opens axially forward into the tool hole.

The drill according to the invention further has a drill housing from which the spindle extends and which is formed with an axially forwardly projecting skirt surrounding the elements and forming an annular compartment. The jaws have rear ends engageable in the compartment. For universal use of the chuck the elements can enclose the rear ends of the jaws in the compartment.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
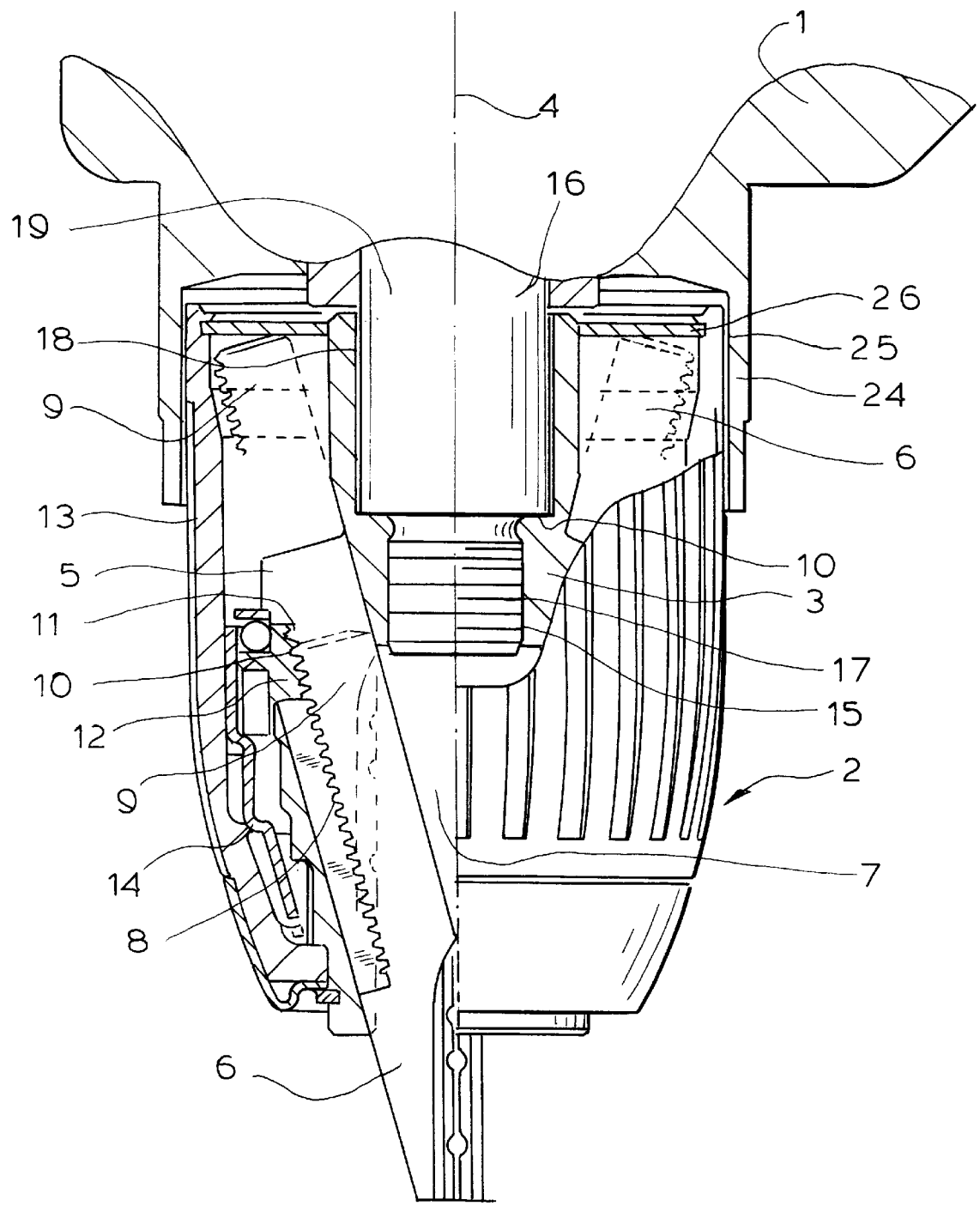
FIG. 1 is an axial section through a drill chuck according to the invention.

As seen in FIG. 1 a hand drill has a housing 1 on which is mounted a chuck 2 having a chuck body 3 centered on and rotatable about an axis 4. This body 3 is formed with three axially extending and angularly equispaced angled guide passages 5 each receiving a respective jaw 6 that can engage a tool or even a workpiece in an axially forwardly open tool recess 7 formed at a front end of the body 3. The jaws 7 each have a rear end 9 formed with a row of teeth 8 meshing with a screwthread 10 of an adjustment ring 12 received in a radially outwardly open annular groove 11 formed in the body 1. An adjustment sleeve 13 is fixed via a connecting sleeve 14 to the ring 12 so that rotation of this sleeve 13 will rotate the ring 12 and thereby axially displace the jaws 6 between the solid-line front gripping position and a dot-dash back retracted position. It is also possible for the guide passages 5 to be formed in the ring 12 and the teeth 8 to be directed radially inward and mesh with teeth of the body 3 in a structure normally set to be self-tightening.

The hand drill having the housing 1 also has a drive spindle 16 centered on the axis 4 and having a small-diameter threaded front end 17 and a larger-diameter shank 19 with a cylindrical outer surface. The front end or tip 17 is engaged in a complementary axially centered and internally threaded bore 15 of the body 3, which bore 15 opens into the tool hole 7, and the shank 19 is received with slight radial play in a cylindrical bore 18 coaxial with the bore 17. In addition the housing 1 is formed with an axially forwardly extending cylindrical skirt 24 that extends forward around a rear end of the chuck 2 and that defines an annular space 25 between itself and the outer surface of the chuck 2, here defined by an outer surface of the adjustment sleeve 13. A rear end of the chuck 2 is closed by a washer 26.

Figure 2:
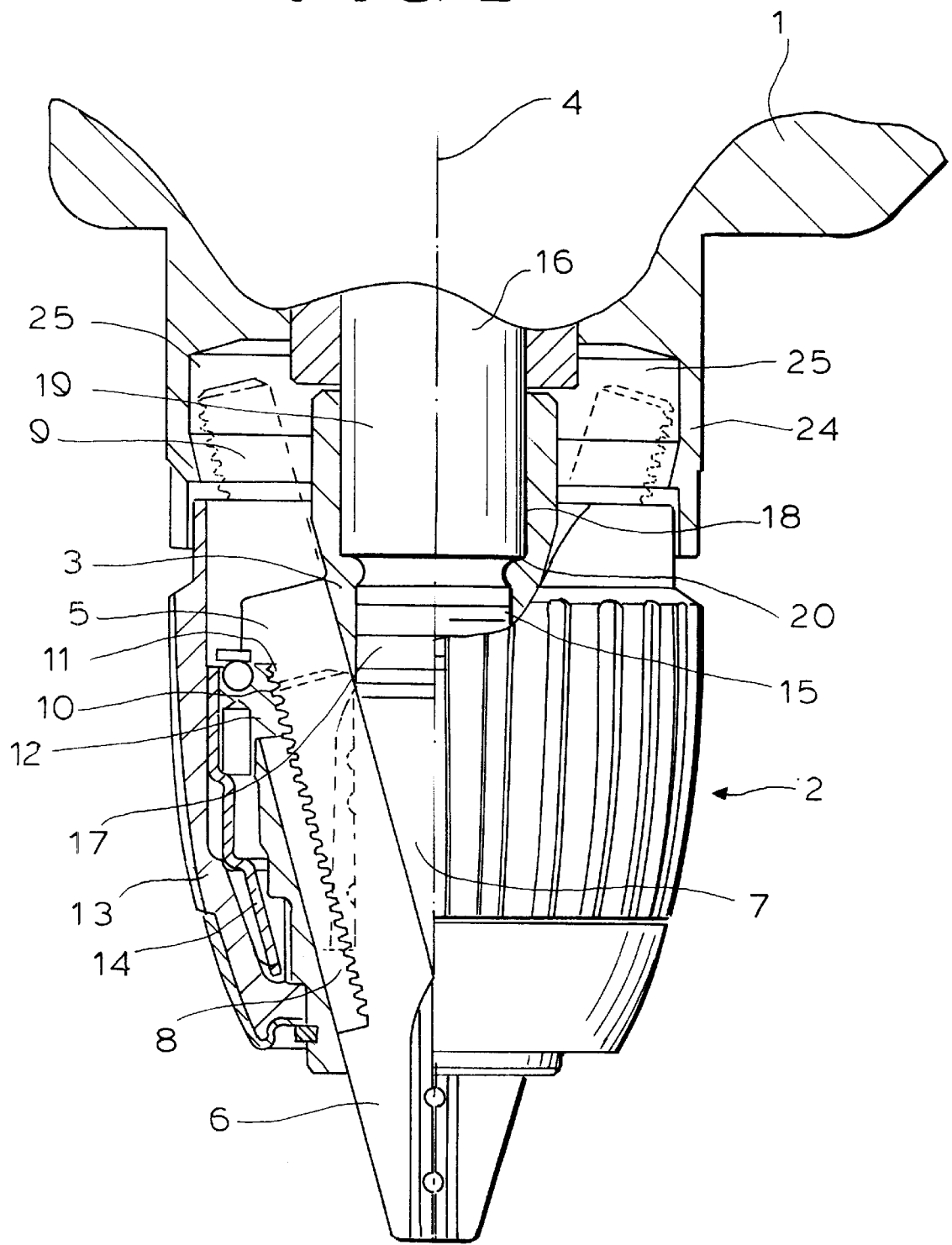
FIGS. 2, 3, and 4 are axial sections through further drill chucks in accordance with the invention.

In FIG. 2 the structure is substantially identical, except that the bore 18' snugly surrounds the shank 16.

Figure 3:
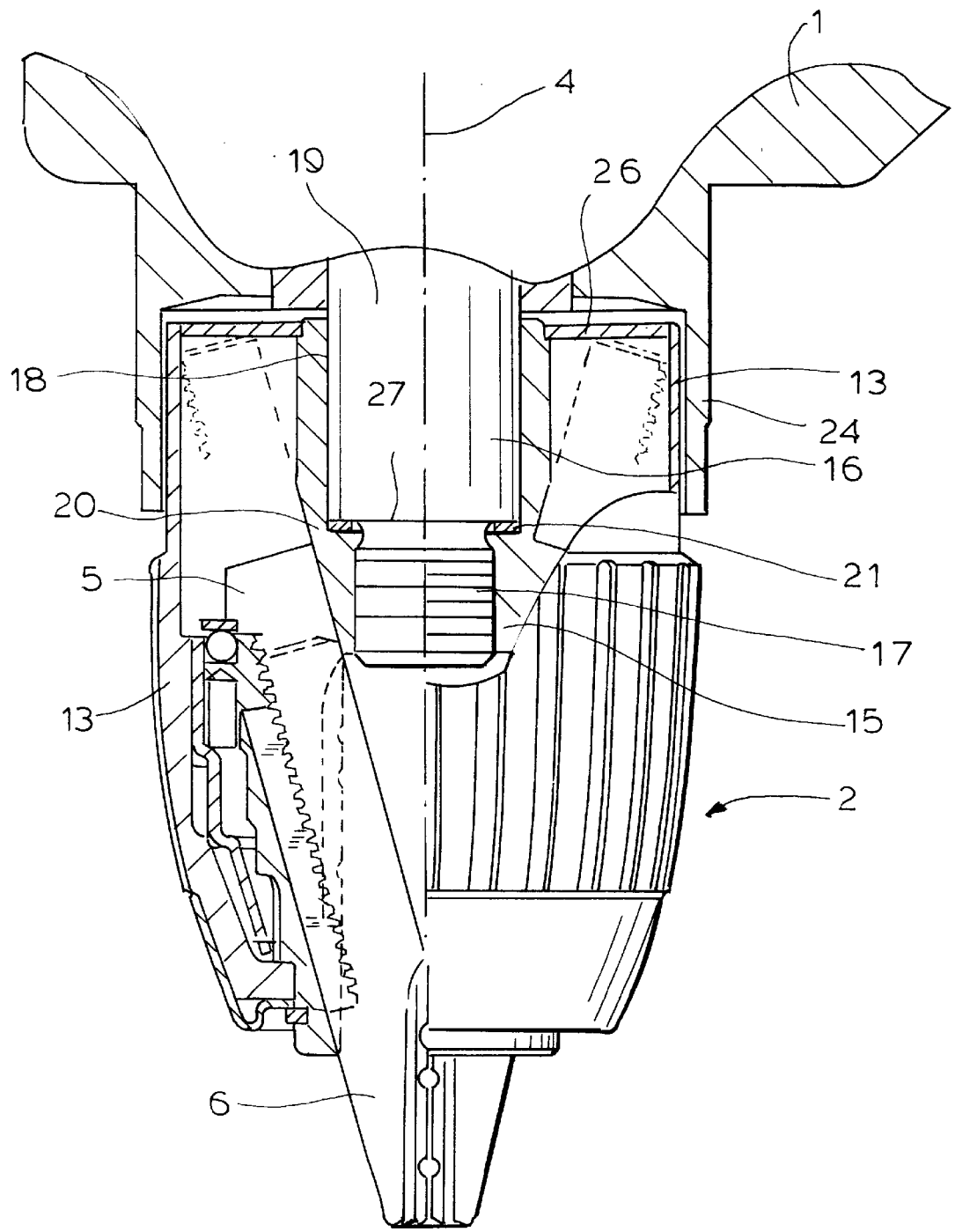

Similarly in FIG. 3 the bore 18' snugly surrounds the shank 19, and a toothed ring 21 is provided between a forwardly directed annular and planar shoulder 27 formed between the spindle parts 17 and 19 and a shoulder 20 formed between the bores 15 and 18'. This toothed ring 21 bites into the chuck body 3 and spindle 16 and serves for bidirectional coupling of the spindle 16 to the chuck 2.

Figure 4:
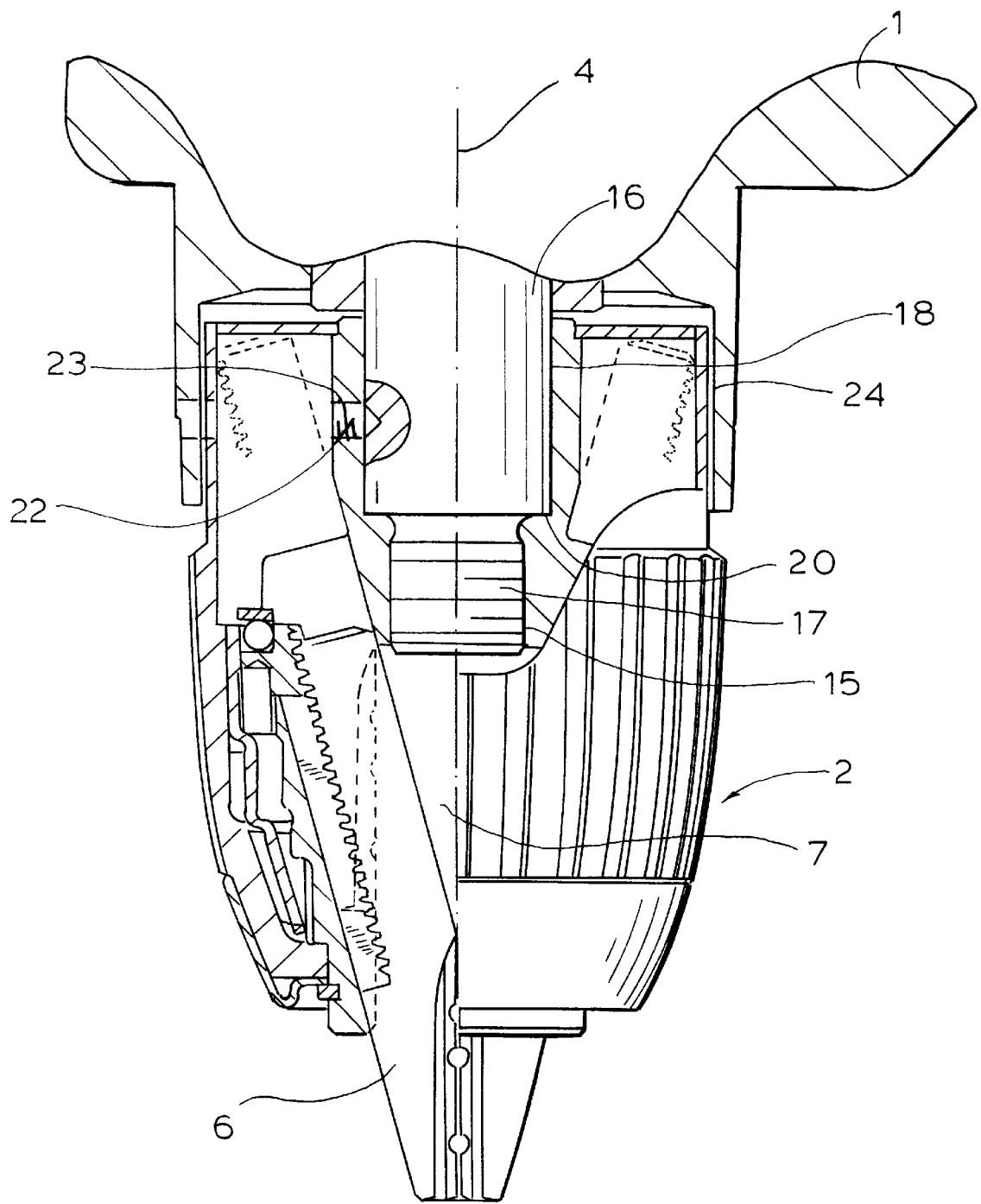

In FIG. 4 the system is identical to that of FIG. 2 except that the chuck body 3 is formed level with the bore 18' with a radially through going threaded bore 23 receiving a set screw 22 that bears radially inward into the spindle shank 19, thereby bidirectionally coupling the chuck body 3 to the spindle 16.

I claim:

1. A drill comprising:

a drill spindle centered on and rotatable about an axis and having a front externally threaded end and immediately thereadjacent a shank;

a chuck element centered on the axis and formed with a forwardly open tool hole, axially therebehind with a threaded bore complimentarily engaging the spindle end, and immediately therebehind with a coaxial unthreaded bore surrounding the shank, the unthreaded bore being of larger diameter than the threaded bore, the chuck element being formed between the threaded and unthreaded bores with a substantially planar and backwardly directed shoulder, the spindle being formed between the threaded end and shank with a forwardly directed substantially annular shoulder confronting the chuck-element shoulder;

an adjustment element rotatable about the axis on the chuck element, one of the elements being formed with a plurality of angled guide passages and the other element being formed with a screwthread centered on the axis;

a toothed washer axially compressed between the shoulders; and respective jaws in the passages and exposed in the tool hole, each jaw having a toothed edge meshing with the other-element screwthread, whereby relative rotation of the elements displaces the jaws along the respective passages.

2. The drill defined in claim 1, further comprising a set screw threaded in the chuck element and radially inwardly bearing on the shank.

3. The drill defined in claim 1 wherein the shank and the unthreaded bore are complementary and the shank is a snug fit in the unthreaded bore.

4. The drill defined in claim 1 wherein the threaded bore opens axially forward into the tool hole.

5. The drill defined in claim 1 wherein the shoulders axially engage each other directly.

6. A drill comprising:

a drill spindle centered on and rotatable about an axis and having a front externally threaded end and immediately thereadjacent a shank;

a chuck element centered on the axis and formed with a forwardly open tool hole, axially therebehind with a threaded bore complimentarily engaging the spindle end, and immediately therebehind with a coaxial unthreaded bore surrounding the shank, the unthreaded bore being of larger diameter than the threaded bore;

an adjustment element rotatable about the axis on the chuck element, one of the elements being formed with a plurality of angled guide passages and the other element being formed with a screwthread centered on the axis;

respective jaws in the passages and exposed in the tool hole, each jaw having a toothed edge meshing with the other-element screwthread, whereby relative rotation of the elements displaces the jaws along the respective passages; and a drill housing from which the spindle extends and formed with an axially forwardly projecting skirt surrounding the elements and forming an annular compartment, the jaws having rear ends engageable in the compartment.

7. The drill defined in claim 6 wherein the elements enclose the rear ends of the jaws in the compartment.

* * * * *